(12) United States Patent
Tsuda

(10) Patent No.: US 7,522,947 B2
(45) Date of Patent: Apr. 21, 2009

(54) IMAGE DISPLAY APPARATUS, DISPLAY CONTROL METHOD FOR THE SAME, PROGRAM, AND STORAGE MEDIUM

(75) Inventor: Yuji Tsuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 369 days.

(21) Appl. No.: 11/271,458

(22) Filed: Nov. 10, 2005

(65) Prior Publication Data

US 2006/0103626 A1  May 18, 2006

(30) Foreign Application Priority Data

Nov. 16, 2004  (JP) .............................. 2004-331937

(51) Int. Cl.
  *H04B 1/38* (2006.01)
(52) U.S. Cl. .............. 455/575.3; 455/575.1; 455/575.4; 455/3.06; 455/575.7; 379/433.13; 379/433.12
(58) Field of Classification Search .............. 455/575.3, 455/3.06, 575.1, 575.4, 575.7; 379/433.13, 379/433.12
  See application file for complete search history.

(56) References Cited

U.S. PATENT DOCUMENTS

| | | | | |
|---|---|---|---|---|
| 4,306,294 A | * | 12/1981 | Hashimoto et al. | .......... 708/109 |
| 5,436,954 A | * | 7/1995 | Nishiyama et al. | .......... 455/566 |
| 5,742,912 A | * | 4/1998 | Nishiyama et al. | .......... 455/566 |
| 5,748,339 A | * | 5/1998 | Suzuki et al. | ................ 358/473 |
| 5,790,193 A | * | 8/1998 | Ohmori | ...................... 348/375 |
| 5,937,360 A | * | 8/1999 | Nishiyama et al. | .......... 455/566 |
| 6,708,046 B1 | | 3/2004 | Takagi | |
| 6,721,420 B1 | * | 4/2004 | Kubo et al. | ............ 379/433.13 |
| 6,952,599 B2 | * | 10/2005 | Noda et al. | .................. 455/566 |
| 7,031,758 B2 | * | 4/2006 | Chang | ..................... 455/575.1 |
| 7,046,287 B2 | * | 5/2006 | Nishino et al. | ......... 348/333.06 |
| 7,133,280 B2 | * | 11/2006 | Love | .......................... 361/681 |
| 7,155,253 B2 | * | 12/2006 | Sawayama et al. | ....... 455/556.1 |
| 7,158,083 B2 | | 1/2007 | Satoh et al. | |
| 7,176,961 B2 | * | 2/2007 | Shimamura | ............ 348/207.99 |
| 7,331,724 B2 | * | 2/2008 | Hasegawa et al. | ........... 396/348 |
| 2002/0194351 A1 | * | 12/2002 | Nishimura et al. | .......... 709/229 |
| 2003/0013417 A1 | | 1/2003 | Bum | |
| 2003/0064758 A1 | * | 4/2003 | Mizuta et al. | ................ 455/566 |
| 2003/0223576 A1 | * | 12/2003 | Totani | .................... 379/433.04 |
| 2005/0062715 A1 | * | 3/2005 | Tsuji et al. | ................... 345/158 |
| 2005/0091431 A1 | * | 4/2005 | Olodort et al. | ................. 710/72 |

(Continued)

FOREIGN PATENT DOCUMENTS

CN  1404281  3/2003

(Continued)

*Primary Examiner*—Matthew D Anderson
*Assistant Examiner*—Minh D Dao
(74) *Attorney, Agent, or Firm*—Canon U.S.A., Inc. I.P. Division

(57) ABSTRACT

An image display apparatus includes a first casing having an operation unit, a second casing having a display unit capable of displaying a plurality of images received from different input sources, and a connection unit configured to interconnect the first and second casings and to allow the second casing to rotate relative to the first casing. Images to be displayed on the display unit are switched responsive to a rotated state of the second casing relative to the first casing.

14 Claims, 11 Drawing Sheets

U.S. PATENT DOCUMENTS

| | | | |
|---|---|---|---|
| 2005/0125570 A1* | 6/2005 | Olodort et al. | 710/15 |
| 2005/0190281 A1* | 9/2005 | Lee et al. | 348/333.12 |
| 2006/0079302 A1* | 4/2006 | Kota et al. | 455/575.3 |
| 2006/0097927 A1 | 5/2006 | Satoh et al. | |
| 2006/0146009 A1* | 7/2006 | Syrbe et al. | 345/156 |
| 2007/0123309 A1* | 5/2007 | Sano et al. | 455/566 |
| 2007/0123322 A1* | 5/2007 | Mizushina | 455/575.1 |
| 2007/0288243 A1* | 12/2007 | Takahashi et al. | 704/276 |
| 2007/0298850 A1* | 12/2007 | Miyata et al. | 455/575.3 |
| 2008/0004083 A1* | 1/2008 | Ohki et al. | 455/566 |
| 2008/0026799 A1* | 1/2008 | Makino et al. | 455/566 |
| 2008/0076492 A1* | 3/2008 | Yamaguchi et al. | 455/575.3 |

FOREIGN PATENT DOCUMENTS

| | | |
|---|---|---|
| JP | 2000-333148 A | 11/2000 |
| JP | 2001-165144 A | 6/2001 |
| JP | 2003-134205 A | 5/2003 |
| JP | 2004-134975 A | 4/2004 |
| KR | 10-2003-0030619 | 4/2003 |
| KR | 20-0330435 | 10/2003 |

* cited by examiner

ASPECT RATIO
WIDTH TO HEIGHT=4 : 3
WIDTH TO HEIGHT=16 : 9

IMAGE DISPLAY APPARATUS, DISPLAY CONTROL METHOD FOR THE SAME, PROGRAM, AND STORAGE MEDIUM

BACKGROUND OF THE INVENTION

1. Field of the Invention

The present invention relates to an image display apparatus such as a television telephone terminal capable of displaying an image received from another terminal.

2. Description of the Related Art

Conventional television telephone terminals include a type called a vertical body (e.g., see Japanese Patent Application Laid-Open No. 2000-333148), a type called a foldable body (e.g., see Japanese Patent Application Laid-Open No. 2001-165144 (corresponding to U.S. Pat. No. 6,708,046)), and a type in which a display unit is switchable between vertical and horizontal postures (e.g., see Japanese Patent Application Laid-Open No. 2003-134205). A recent sudden increase in use of television telephone terminals in which a television function and a telephone function are integrated has been accompanied by significant technical innovations in function, structure, and the like.

Conventional television telephone terminals will be described below with reference to FIGS. 14 and 15. FIG. 14 shows a television telephone terminal of a type generally called a vertical body. This television telephone terminal includes a display unit 1401 disposed in an upper part of the body, an operation unit 1402 disposed in a lower part of the body, and a slide switch 1403 for switching among three modes of the body, i.e., a power off mode, a television mode, and a telephone mode. In the case of selecting the power off mode, the slide switch 1403 is slid to an OFF position indicated by 1405 to switch to the power off mode. In the case of selecting the television mode, the slide switch 1403 is slid to a television position indicated by 1404 to switch to the television mode. In the case of selecting the telephone mode, the slide switch 1403 is slid to a telephone position indicated by 1406 to switch to the telephone mode.

On the other hand, another version of television telephone terminal which is shown in FIG. 15 is a type called a foldable body designed to improve portability. This television telephone terminal includes an input function side casing 1502 which is a fixed side casing, a plurality of input buttons 1504 for operations, and a display function side casing 1501 which is a movable side casing. The television telephone terminal further includes a hinge 1503 adapted to interconnect the input function side casing 1502 and the display function side casing 1501 to rotate relative to each other. An arrow 1505 indicates a direction in which the display function side casing 1501 is opened with respect to the input function side casing 1502. An arrow 1506 indicates a direction in which the display function side casing 1501 is folded with respect to the input function side casing 1502. To switch among three modes of the body, i.e., a power off mode, a television mode, and a telephone mode, dedicated push switches are provided. In the case of selecting the power off mode, a push switch 1508 is pushed to switch the body to the power off mode. In the case of selecting the television mode, a push switch 1509 is pushed to switch the body to the television mode. In the case of selecting the telephone mode, a push switch 1510 is pushed to switch the body to the telephone mode.

Common to the aforementioned television telephone terminals shown in FIGS. 14 and 15 is a configuration to set the main body to the power off mode, to the television mode, or to the telephone mode. Such setting is carried out by a user operating a dedicated input key or button to switch the modes.

In such television telephone terminals, both keys are operable when the television mode is selected. Further, keys operable when the telephone mode is selected are arranged in the main body. For example, in FIG. 14, reference numerals 1407 and 1408 denote telephone directory menu switching keys for the telephone mode, and reference numerals 1410 and 1409 denote tuner frequency selection keys for the television mode. Referring to FIG. 15, reference numerals 1511 and 1512 denote telephone directory menu switching keys for the telephone mode, and reference numerals 1513 and 1514 denote tuner frequency selection keys for the television mode.

In the display unit 1401 of the conventional example of FIG. 14 and the display unit 1507 of the conventional example of FIG. 15, generally vertically long displaying is employed. In the telephone mode, an address book for making a call is displayed on the display unit 1401 or 1507, which is used for simultaneously displaying a number of telephone numbers so that a user can select one from a plurality of telephone numbers. In the television mode, a television receiving screen is displayed on the display unit 1401 or 1507. In the display unit 1401 or 1507, its aspect ratio is not changed irrespective of selection of the telephone mode or the television mode.

However, in the case of the aforementioned conventional television telephone terminals, generally, the vertically long display units are used as indicated by reference numeral 1401 of FIG. 14 and reference numeral 1507 of FIG. 15. Accordingly, when the television mode is selected, a vertically long image is obtained if television pictures are displayed while being matched with a display area of the display unit 1401 or 1507. However, most television pictures received in the television mode are horizontally long images. Therefore, displaying only vertically long images imposes a limitation on a range of receiving and viewing images, or the like, thus causing a lack of convenience for the user. Additionally, for example, the placement of the dedicated changeover switches on the main body to switch among a plurality of modes, i.e., the power off mode, the telephone mode, and the television mode, is a great obstacle to miniaturization and cost reduction of the main body.

SUMMARY OF THE INVENTION

An aspect of the present invention is to overcome the above-described drawbacks.

Another aspect of the present invention is to provide an image display apparatus capable of realizing miniaturization and cost reduction and of executing image displaying matched with an input source and an image shape with an easy operation, as well as a display control method for the same, a program, and a storage medium.

In one embodiment of the present invention, an image display apparatus is provided which includes a first casing having an operation unit, a second casing having a display unit capable of displaying a plurality of images received from different input sources, a connection unit configured to interconnect the first and second casings and to allow the second casing to rotate relative to the first casing, and a display control unit configured to, responsive to a rotated state of the second casing relative to the first casing, switch images to be displayed on the display unit.

In another embodiment of the present invention, a display control method is provided for an image display apparatus including a first casing having an operation unit, a second casing having a display unit capable of displaying a plurality of images received from different input sources, and a connection unit configured to interconnect the first and second casings and to allow the second casing to rotate relative to the first casing. The display control method includes detecting a rotated state of the second casing relative to the first casing; and switching images to be displayed on the display unit responsive to the rotated state of the second casing relative to the first casing.

In another embodiment of the present invention, a computer readable medium is provided containing computer-executable instructions to perform a display control method for an image display apparatus including a first casing having an operation unit, a second casing having a display unit capable of displaying a plurality of images received from different input sources, and a connection unit configured to interconnect the first and second casings and to allow the second casing to rotate relative to the first casing. The computer readable medium includes computer-executable instructions for detecting a rotated state of the second casing relative to the first casing; and computer-executable instructions for, responsive to the rotated state of the second casing relative to the first casing detected in the detection code, switching images to be displayed on the display unit.

In another embodiment of the present invention, an image display apparatus is provided which includes a first casing having an operation unit, a second casing having a display unit capable of displaying a plurality of images received from different input sources, a connection unit configured to interconnect the first and second casings and further adapted to allow the second casing to rotate relative to the first casing; and a control unit configured to, responsive to a rotated state of the second casing relative to the first casing, switch a telephone mode to a television mode for displaying a picture obtained through reception of television broadcast on the image display unit.

In another embodiment of the present invention, a display control method is provided for an image display apparatus including a first casing having an operation unit, a second casing having a display unit capable of displaying a plurality of images received from different input sources, and a connection unit configured to interconnect the first and second casings and to allow the second casing to rotate relative to the first casing. The display control method includes detecting a rotated state of the second casing relative to the first casing, and switching a telephone mode to a television mode for displaying a picture obtained through reception of television broadcast on the image display unit, responsive to the rotated state of the second casing relative to the first casing.

In another embodiment of the present invention, a computer readable medium is provided containing computer-executable instructions to perform a display control method for an image display apparatus including a first casing having an operation unit, a second casing having a display unit capable of displaying a plurality of images received from different input sources, and a connection unit configured to interconnect the first and second casings and to allow the second casing to rotate relative to the first casing. The computer readable medium includes computer-executable instructions for detecting a rotated state of the second casing relative to the first casing, and computer-executable instructions for switching a telephone mode to a television mode for displaying a picture obtained through reception of television broadcast on the image display unit, responsive to the rotated state of the second casing relative to the first casing.

Further aspects and features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate various embodiments of the present invention and, together with the description, serve to explain the principles of the invention.

DETAILED DESCRIPTION OF THE EMBODIMENTS

Embodiments of the invention will be described in detail below with reference to the drawings.

First Exemplary Embodiment

Figure 1:
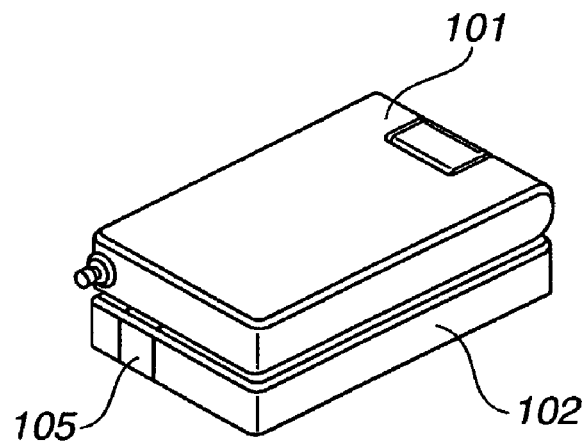
FIG. 1 is a perspective view of a television telephone terminal when a "power off mode" is selected, showing a state in which a first and second casing of the television telephone terminal are lapped over each other, according to a first embodiment.
Figure 2:
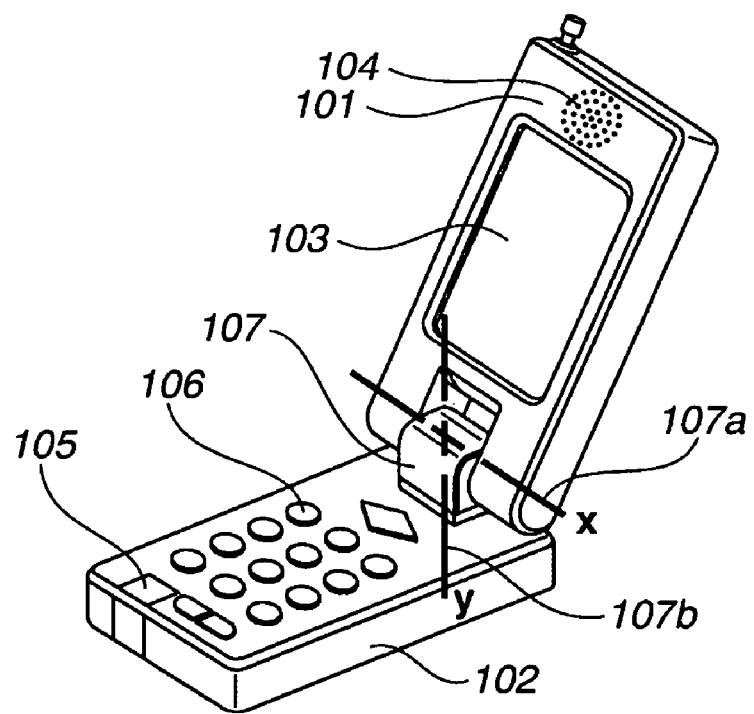
FIG. 2 is a perspective view of the television telephone terminal when a "telephone mode" is selected, showing a state in which the first and second casings of the television telephone terminal are opened in an opening/closing direction via a hinge section, according to the first embodiment.
Figure 3:
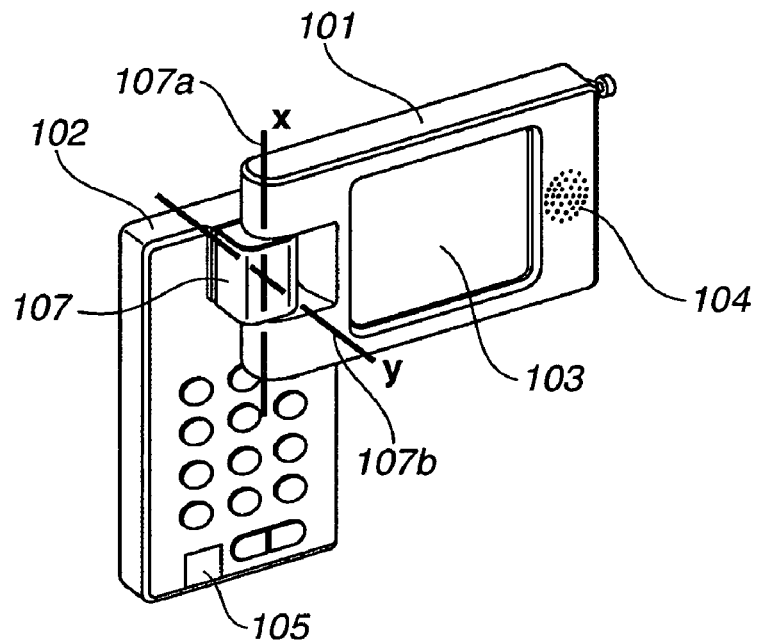
FIG. 3 is a perspective view of the television telephone terminal when a "television mode" is selected, showing a state in which the first and second casings of the television telephone terminal are opened in the opening/closing direction via the hinge section, and, then, the second casing is rotated by 90° relative to the first casing via a second shaft orthogonal to an opening/closing shaft of the hinge section, according to the first embodiment.

FIGS. 1 to 3 show a configuration of a television telephone terminal according to a first embodiment of the present invention. Reference numeral 103 in FIG. 2 denotes a display unit adapted to display a telephone number or a stored telephone directory at the time of transmission in a telephone mode for transferring a video phone image with another television telephone terminal, and to display a received television picture image in a television mode for receiving broadcast signals from predetermined broadcast stations. In the state shown in FIG. 2, the display unit 103 is narrower in a horizontal direction than in a vertical direction. Reference numeral 104 denotes a speaker used for reception in the telephone mode, and used for outputting a television voice in the television mode. Reference numeral 101 denotes a first casing, which includes the display unit 103 and the speaker 104. Reference numeral 105 denotes a microphone used for transmission in the telephone mode. Reference numeral 106 denotes an operation unit that includes input keys used for inputting a telephone number, setting a telephone directory, or selecting the same in the telephone mode, and used for selecting and setting a channel, adjusting a sound volume, or setting a channel frequency in the television mode. Reference numeral 102 denotes a second casing, which includes the microphone 105 and the operation unit 106.

Reference numeral 107 denotes a hinge section adapted to interconnect the first and second casings 101 and 102. The hinge section 107 includes an opening/closing shaft 107a (notationally illustrated by an axis "x") with which the first and second casings 101 and 102 are interconnected to open and close, and is configured to be rotatable with respect to a second shaft 107b (notationally illustrated by an axis "y") orthogonal to the opening/closing shaft 107a. It is noted that the television telephone terminal incorporates a transmission/reception antenna (not shown) for telephone through a communication line, and a reception antenna (not shown) for television broadcast.

Various positional configurations or states of the television telephone terminal with regard to the first and second casings 101 and 102 shown in FIGS. 1 to 3 will now be discussed. FIG. 1 is a perspective view of the television telephone terminal showing a state in which the first and second casings 101 and 102 are lapped over each other. In this state, the television telephone terminal is set to the power off mode. FIG. 2 is a perspective view of the television telephone terminal showing a state in which the first and second casings 101 and 102 are opened in an opening/closing direction via the hinge section 107. In this state, the television telephone terminal is set to the telephone mode. FIG. 3 is a perspective view of the television telephone terminal showing a state in which the first and second casings 101 and 102 are opened in the opening/closing direction via the hinge section 107, and, then, the second casing 102 is rotated by 90° in a rotational direction relative to the first casing 101 via the second shaft 107b orthogonal to the opening/closing shaft 107a. In this state, the television telephone terminal is set to the television mode.

Figure 8:
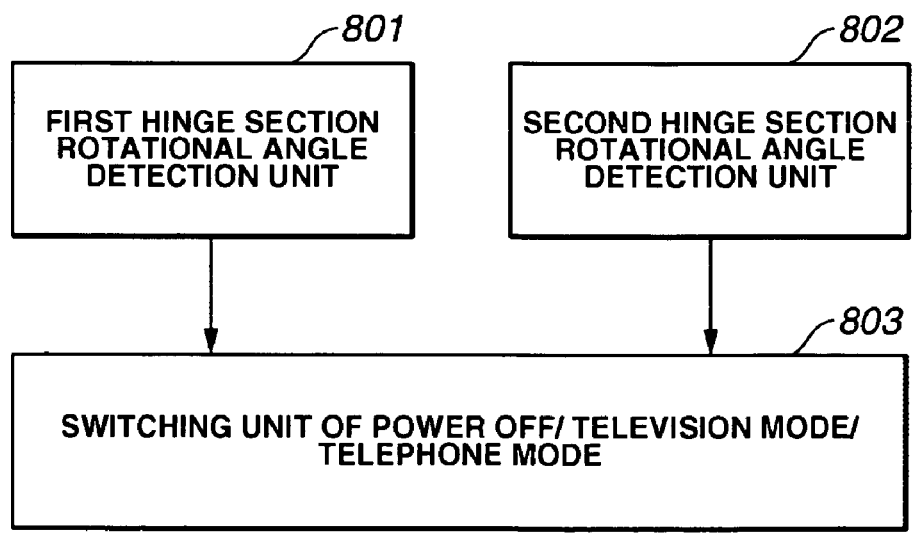
FIG. 8 is a block diagram of the television telephone terminal according to the first embodiment.

FIG. 8 illustrates a block diagram of the television telephone terminal according to the first embodiment. In FIG. 8, reference numeral 801 denotes a first hinge section rotational angle detection unit. The first hinge section rotational angle detection unit 801 detects a first rotational angle of the hinge section 107, especially, an opening/closing degree between the first and second casings 101 and 102. Reference numeral 802 denotes a second hinge section rotational angle detection unit. The second hinge section rotational angle detection unit 802 detects a second rotational angle of the hinge section 107, especially, a degree of rotation of the hinge section 107 with respect to the second shaft 107b orthogonal to the opening/closing shaft 107a for the first and second casings 101 and 102. Reference numeral 803 denotes a switching unit adapted to switch among the power off mode, the television mode, and the telephone mode. The switching unit 803 receives output signals from the first and second rotational angle detection units 801 and 802. Then, based on the output signals, the switching unit 803 selects one of the three modes, i.e., the power off mode, the television mode, and the telephone mode, and executes mode switching.

Figure 9:
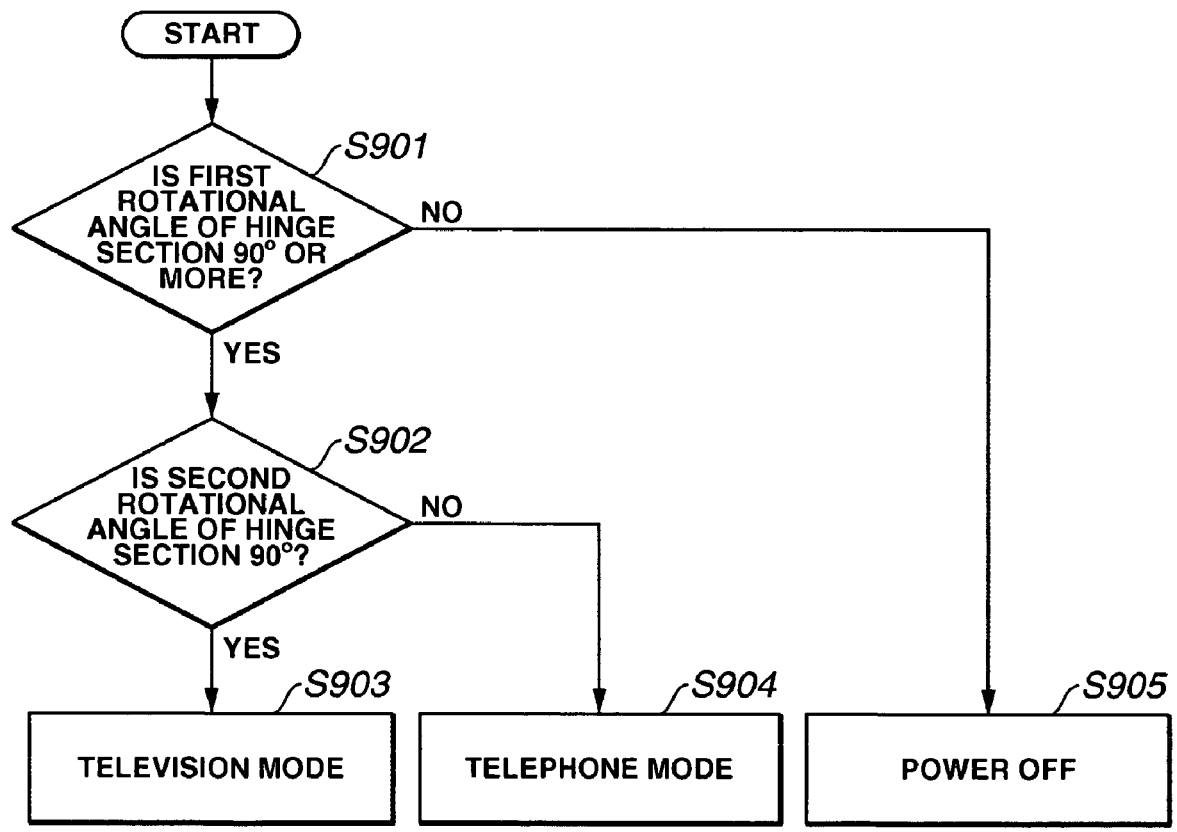
FIG. 9 is a flowchart showing an operation of the television telephone terminal according to the first embodiment.

Mode switching will now be specifically described next with reference to a flowchart of FIG. 9. First, in step S901, an opening/closing degree between the first and second casings 101 and 102 is detected. If the opening/closing degree is determined to be less than 90°, the television telephone terminal is set to the power off mode (specifically see FIG. 1) in step S905. If, in step S901, the opening/closing degree between the first and second casings 101 and 102 is determined to be 90° or more, in step S902, a degree of rotation of the hinge section 107 with respect to the second shaft 107b orthogonal to the opening/closing shaft 107a for the first and second casings 101 and 102 is detected. If the degree of rotation is determined not to be 90°, the television telephone terminal is switched to the telephone mode (specifically see FIG. 2) in step S904. If, in step S902, the degree of rotation of the hinge section 107 with respect to the second shaft 107b orthogonal to the opening/closing shaft 107a for the first and second casings 101 and 102 is determined to be 90°, the television telephone terminal is switched to the television mode (specifically see FIG. 3) in step S903. In the above step S901, it is determined whether the first rotational angle of the hinge section 107 is 90° or more. However, the first rotational angle is not limited to 90°. It can be set to any number of degrees. Similarly, in the above step S902, it is determined whether the second rotational angle of the hinge section 107 is 90° or not. However, the second rotational angle is not limited to 90°. It can be set to any number of degrees.

As described above, switching among three modes, i.e., the power off mode, the telephone mode, and the television mode, is carried out based on the opening/closing degree between the first and second casings 101 and 102 and the degree of rotation of the hinge section 107 with respect to the second shaft 107b orthogonal to the opening/closing shaft 107a. Accordingly, the first and second casings 101 and 102 are lapped over each other in the power off mode. Thus, even when the television telephone terminal body is housed to be carried or carelessly carried in a pocket of clothing, the display unit 103 of the first casing 101 is protected. Thus, the display unit 103 becomes resistant to scratch or damage, and the operation unit 106 of the second casing 102 is also protected, so that a mistaken operation on the operation keys can be prevented. In the telephone mode, the first and second casings 101 and 102 are opened in the opening/closing direction via the hinge section 107, and a physical distance between the speaker 104 and the microphone 105 is made longer, thus increasing usability for a user. The user can operate the operation unit 106 while directly viewing the display unit 103, so that inputting of a telephone number and work of editing, setting and selecting a telephone directory can be facilitated. Additionally, in the television mode, the display unit 103 takes a horizontal posture, thus approaching an aspect ratio of actually received television pictures. Since the user can operate the operation unit 106 while directly viewing the display unit 103, the user can carry out actual work of selecting a television channel while seeing the display unit 103.

As described above, switching among three modes, i.e., the power off mode, the telephone mode, and the television mode, can be carried out by changing the connected state of the first and second casings 101 and 102 via the hinge section 107. Thus, dedicated keys for switching among three modes, i.e., the power off mode, the telephone mode, and the television mode, are made unnecessary, so that the television telephone terminal body can be miniaturized and cost reduction can be achieved.

Second Exemplary Embodiment

Figure 4:
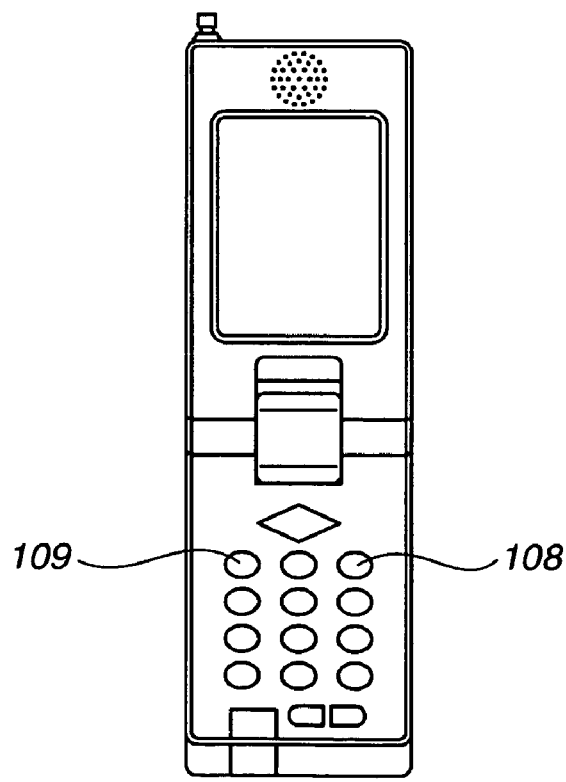
FIG. 4 is a perspective view of a television telephone terminal when a "telephone mode" is selected, showing a state in which first and second casings of the television telephone terminal are opened in an opening/closing direction via a hinge section, according to a second embodiment.
Figure 5:
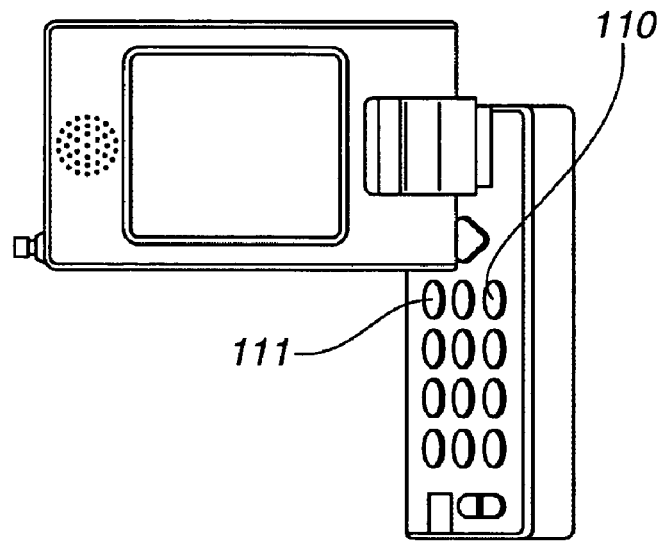
FIG. 5 is a perspective view of the television telephone terminal when a "television mode" is selected, showing a state in which the first and second casings of the television telephone terminal are opened in the opening/closing direction via the hinge section, and, then, the second casing is rotated by 90° relative to the first casing via a second shaft orthogonal to an opening/closing shaft of the hinge section, according to the second embodiment.

FIGS. 4 and 5 show a configuration of a television telephone terminal according to a second embodiment of the present invention. According to the second embodiment, the method of switching among three modes, i.e., the power off mode, the telephone mode, and the television mode, is similar to that of the first embodiment, and thus, a description thereof will not be repeated here. However, according to the second embodiment, when a switch is made between the television mode and the telephone mode, functions of specific keys are also switched according to a selected mode.

Figure 14:
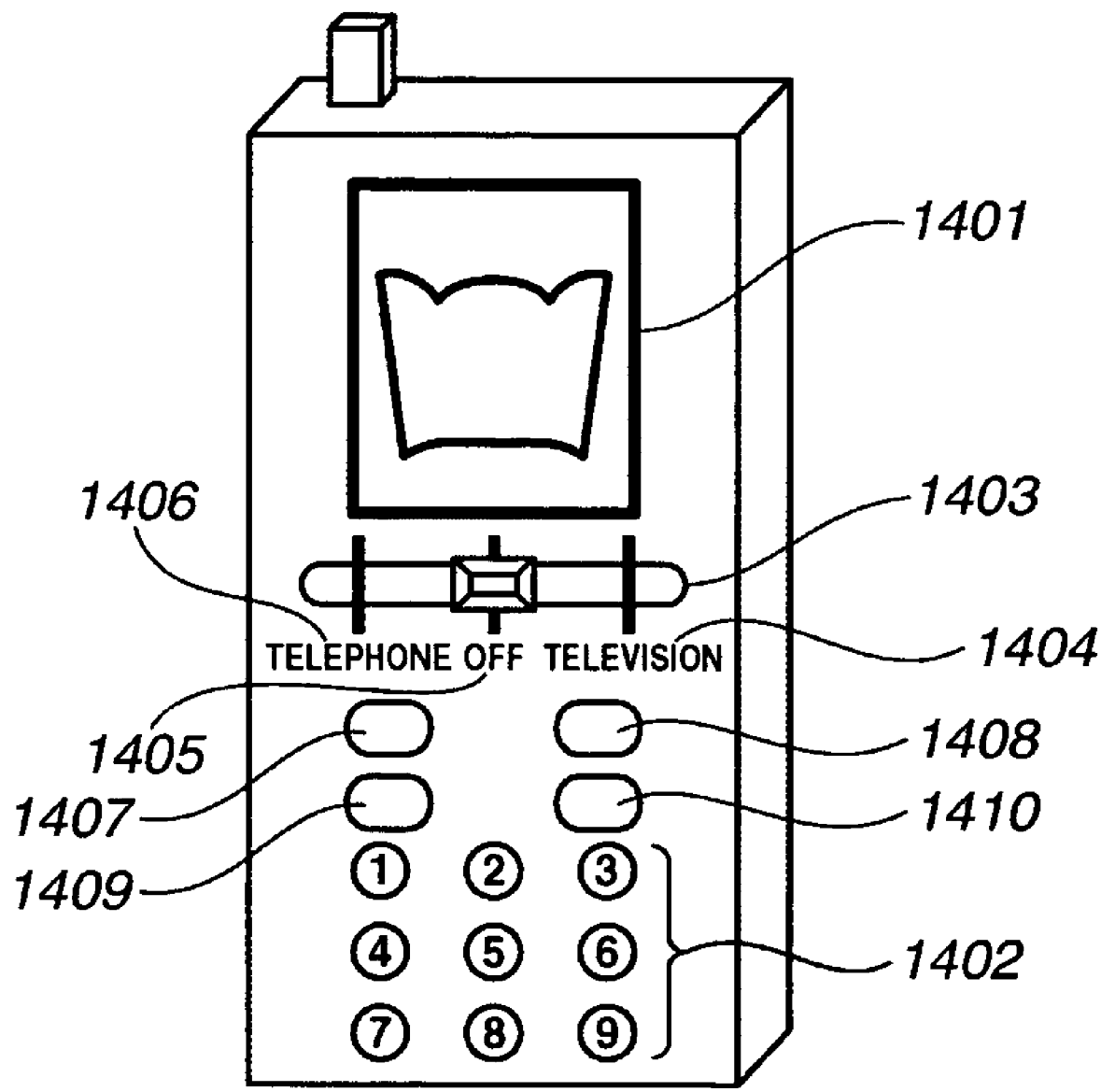
FIG. 14 is a perspective of a conventional television telephone terminal.
Figure 15:
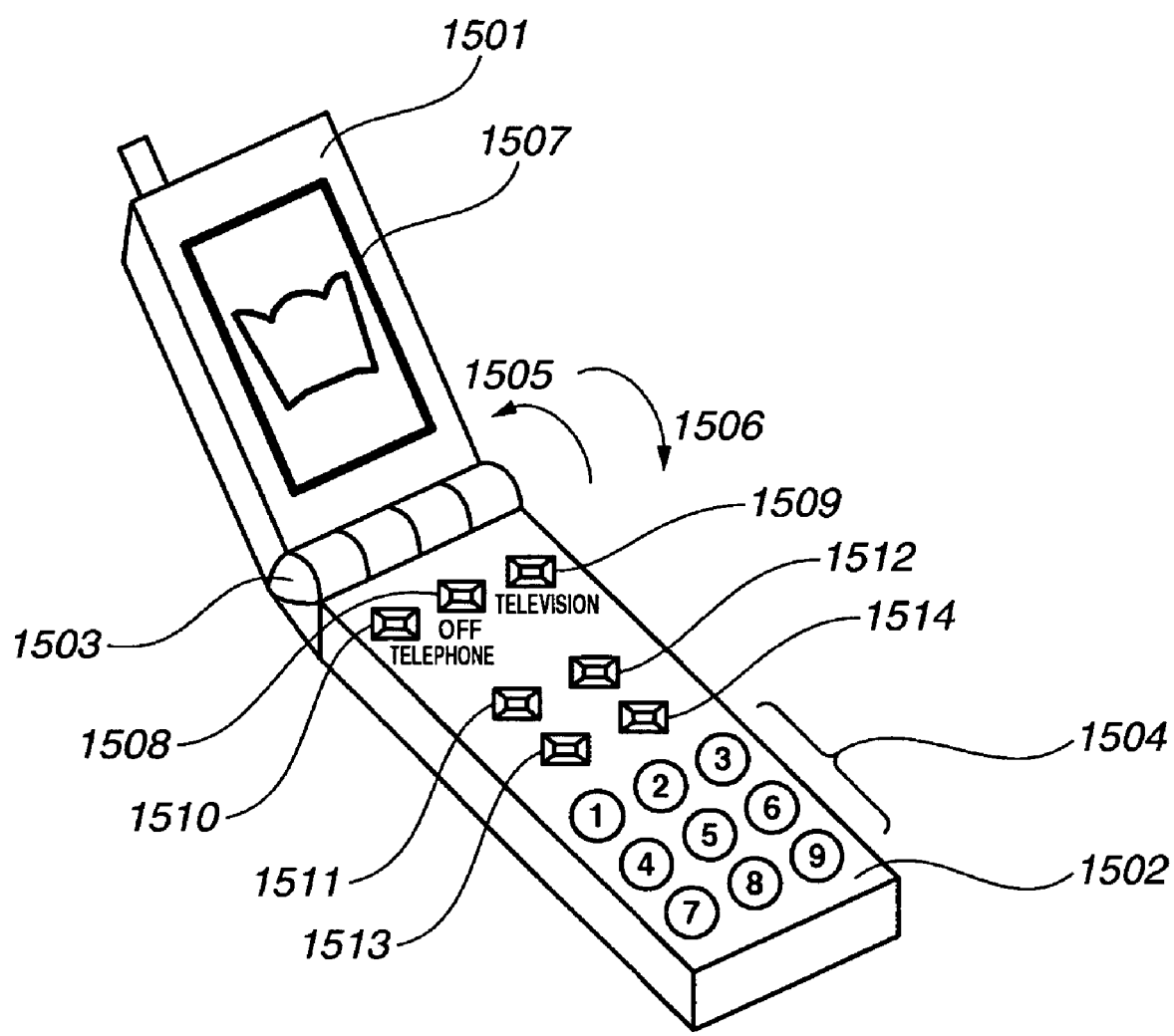
FIG. 15 is a perspective of another conventional television telephone terminal.

FIG. 4 shows the television telephone terminal when the telephone mode is selected. In FIG. 4, first switching for a mail menu is allocated to a key 108, and second switching for the mail menu is allocated to a key 109. FIG. 5 shows the television telephone terminal when the television mode is selected. In FIG. 5, first switching for a sound volume (switching to increasing the sound volume) is allocated to a key 110, which is the same as the key 108 shown in FIG. 4, and second switching for the sound volume (switching to decreasing the sound volume) is allocated to a key 111, which is the same as the key 109 shown in FIG. 4. These keys are denoted by reference numerals 1407, 1408, 1409, and 1410 in the conventional example of FIG. 14, and denoted by reference numerals 1511, 1512, 1513, and 1514 in the conventional example of FIG. 15. In other words, according to the conventional examples shown in FIGS. 14 and 15, four function keys of the first switching for the mail menu, the second switching for the mail menu, the first switching for the sound volume (switching to increasing the sound volume), and the second switching for the sound volume (switching to decreasing the sound volume) are independently arranged.

Figure 10:
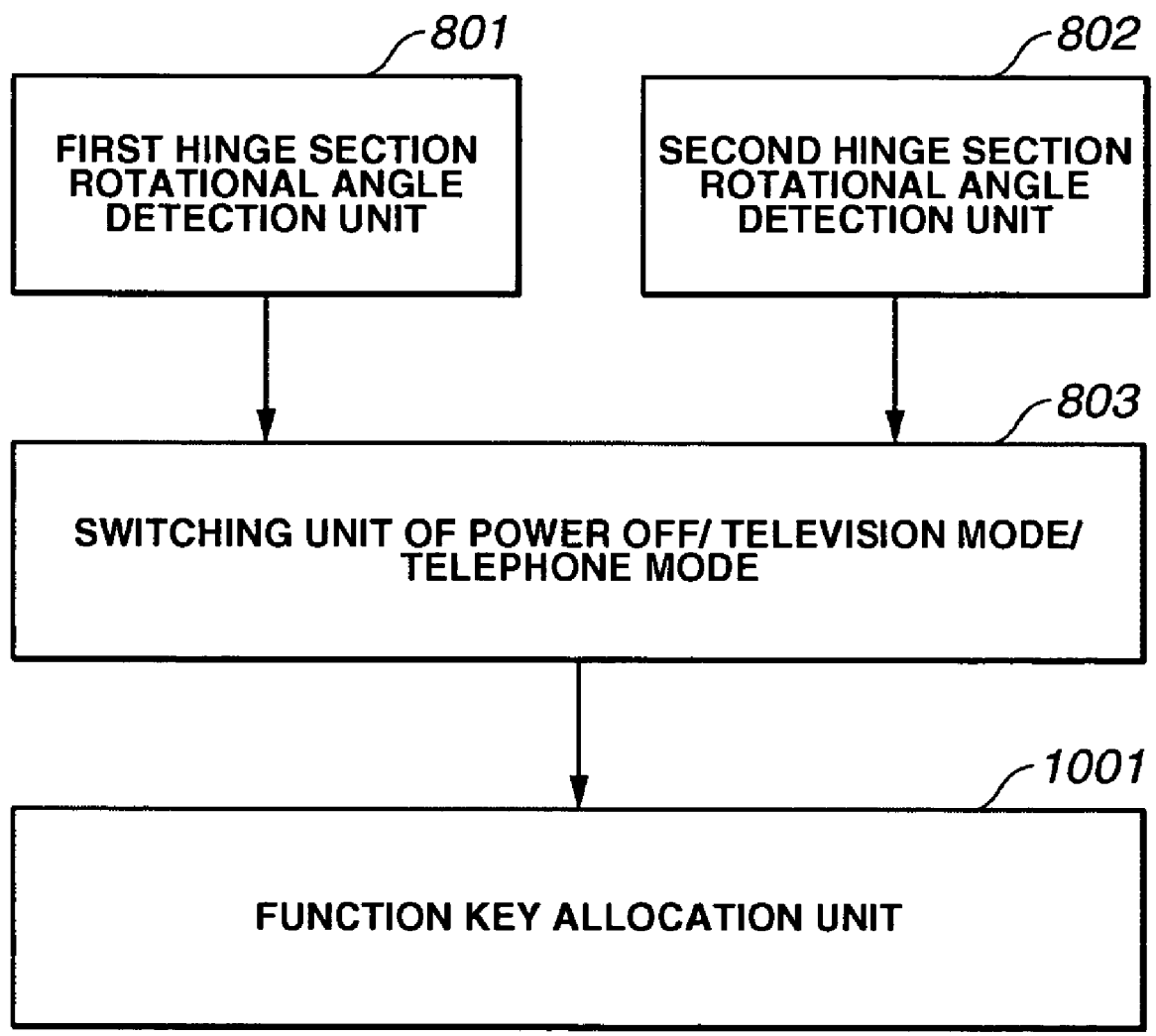
FIG. 10 is a block diagram of the television telephone terminal according to the second embodiment.

FIG. 10 is a block diagram of the television telephone terminal according to the second embodiment. Blocks 801 to 803 of FIG. 10 are similar in configuration to blocks 801 to 803 of the first embodiment shown in FIG. 8, and, thus, a description thereof will not be repeated here. Reference numeral 1001 denotes a function key allocation unit adapted to allocate function keys according to a mode selected by the switching unit 803 for the power off mode, the television mode, and the telephone mode.

Figure 11:
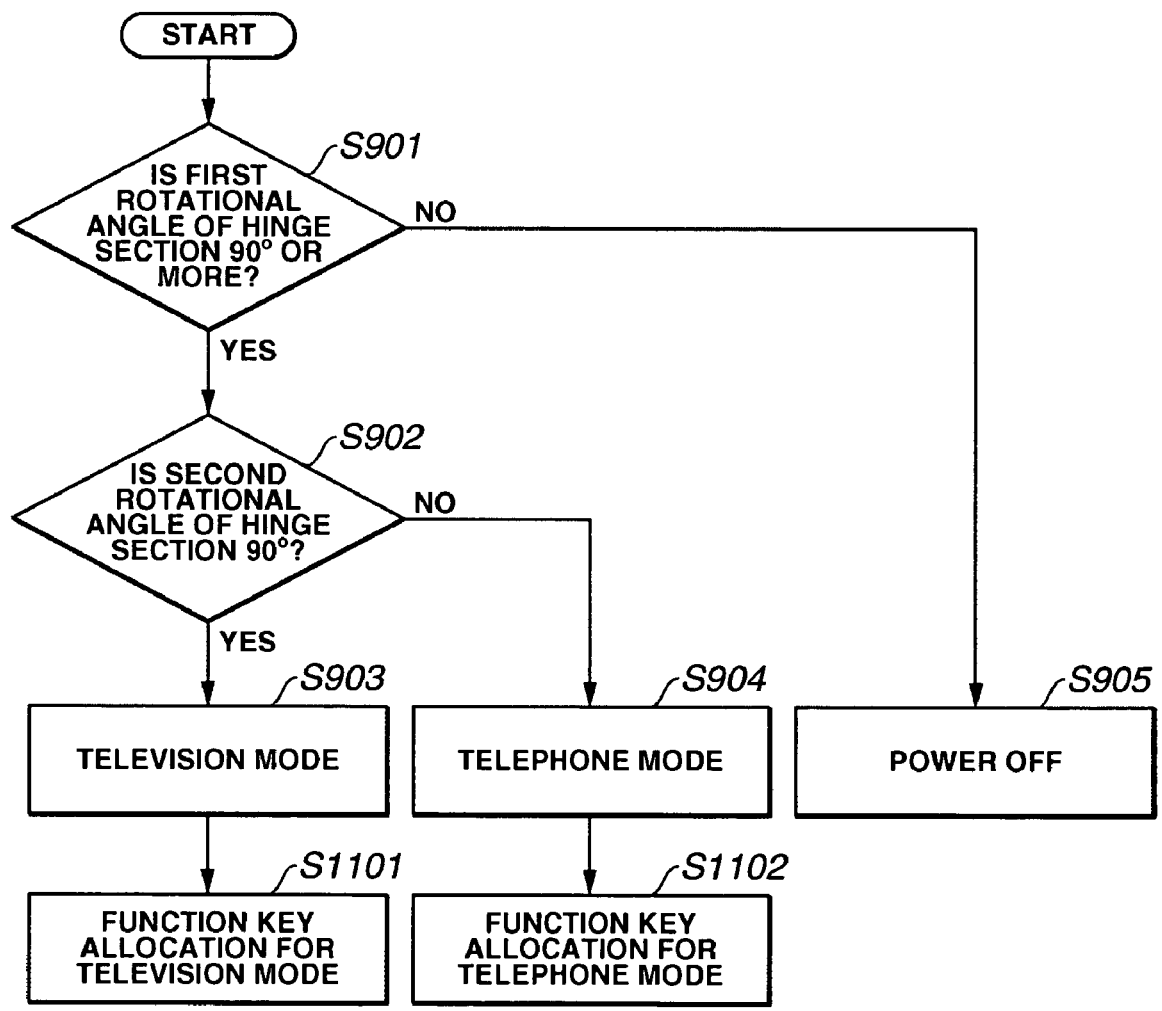
FIG. 11 is a flowchart showing an operation of the television telephone terminal according to the second embodiment.

Function key allocation will be specifically described below with reference to a flowchart of FIG. 11. Steps S901 to S905 of FIG. 11 are similar to steps S901 to S905 of FIG. 9, and, thus, a description thereof will not be repeated here. In step S1101, key allocation for the television mode is carried out. In step S1102, key allocation for the telephone mode is carried out. For example, in the television mode, a mail function is not used. Accordingly, it is not necessary to allocate keys for first switching of the mail menu and second switching of the mail menu to the body of the television telephone terminal. Similarly, in the telephone mode, frequent changes of the sound volume are not necessary. Thus, it is not necessary to allocate a key for first switching for the sound volume (switching to increasing the sound volume), and a key for second switching for the sound volume (switching to decreasing the sound volume) to the body of the television telephone terminal.

In other words, as necessary functions are different between the telephone and television modes, only keys necessary for the selected mode are allocated. Thus, the number of keys on the television telephone terminal body can be reduced. As a result, the television telephone terminal body can be miniaturized, and cost reduction can be achieved.

Third Exemplary Embodiment

Figure 6:
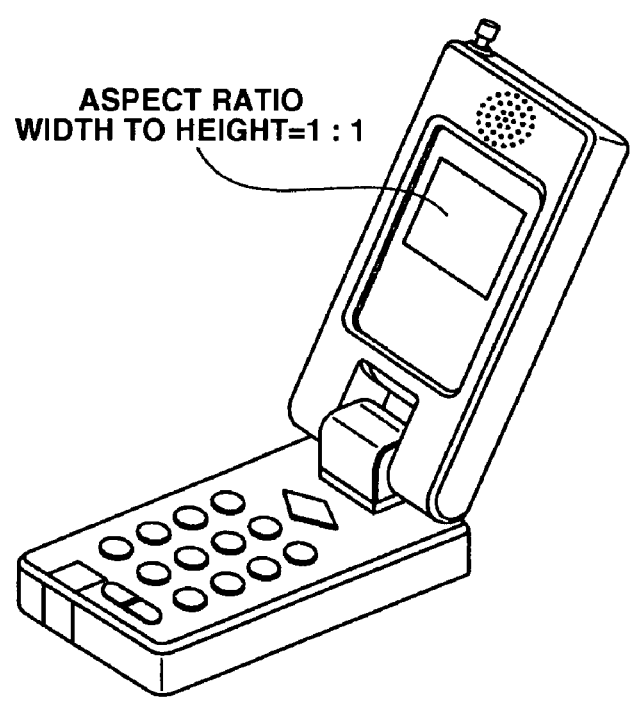
FIG. 6 is a perspective view of a television telephone terminal when a "telephone mode" is selected, showing a state in which first and second casings of the television telephone terminal are opened in an opening/closing direction via a hinge section, according to a third embodiment.
Figure 7:
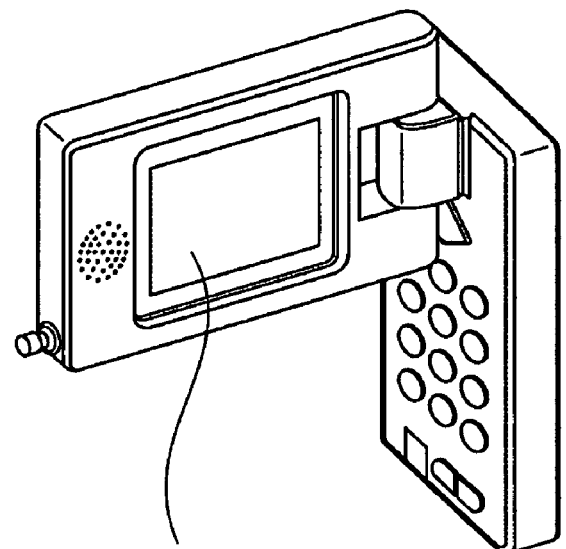
FIG. 7 is a perspective view of the television telephone terminal when a "television mode" is selected, showing a state in which the first and second casings of the television telephone terminal are opened in the opening/closing direction via the hinge section, and, then, the second casing is rotated by 90° relative to the first casing via a second shaft orthogonal to an opening/closing shaft of the hinge section, according to the third embodiment.

FIGS. 6 and 7 show a configuration of a television telephone terminal according to a third embodiment of the present invention. According to the third embodiment, the method of switching among three modes, i.e., the power off mode, the telephone mode, and the television mode, is similar to that of the first embodiment, and thus, a description thereof will not be repeated here. However, in the third embodiment, when switching is made between the television and telephone modes, an aspect ratio of the display unit 103 is switched according to a selected mode.

FIG. 6 shows the television telephone terminal when the telephone mode is selected, and FIG. 7 shows the television telephone terminal when the television mode is selected. In the case of a display section as indicated by reference numerals 1401 and 1507 in the conventional examples of FIGS. 14 and 15, the aspect ratio of the display section is not switched but fixed irrespective of selection of the telephone mode or the television mode.

Figure 12:
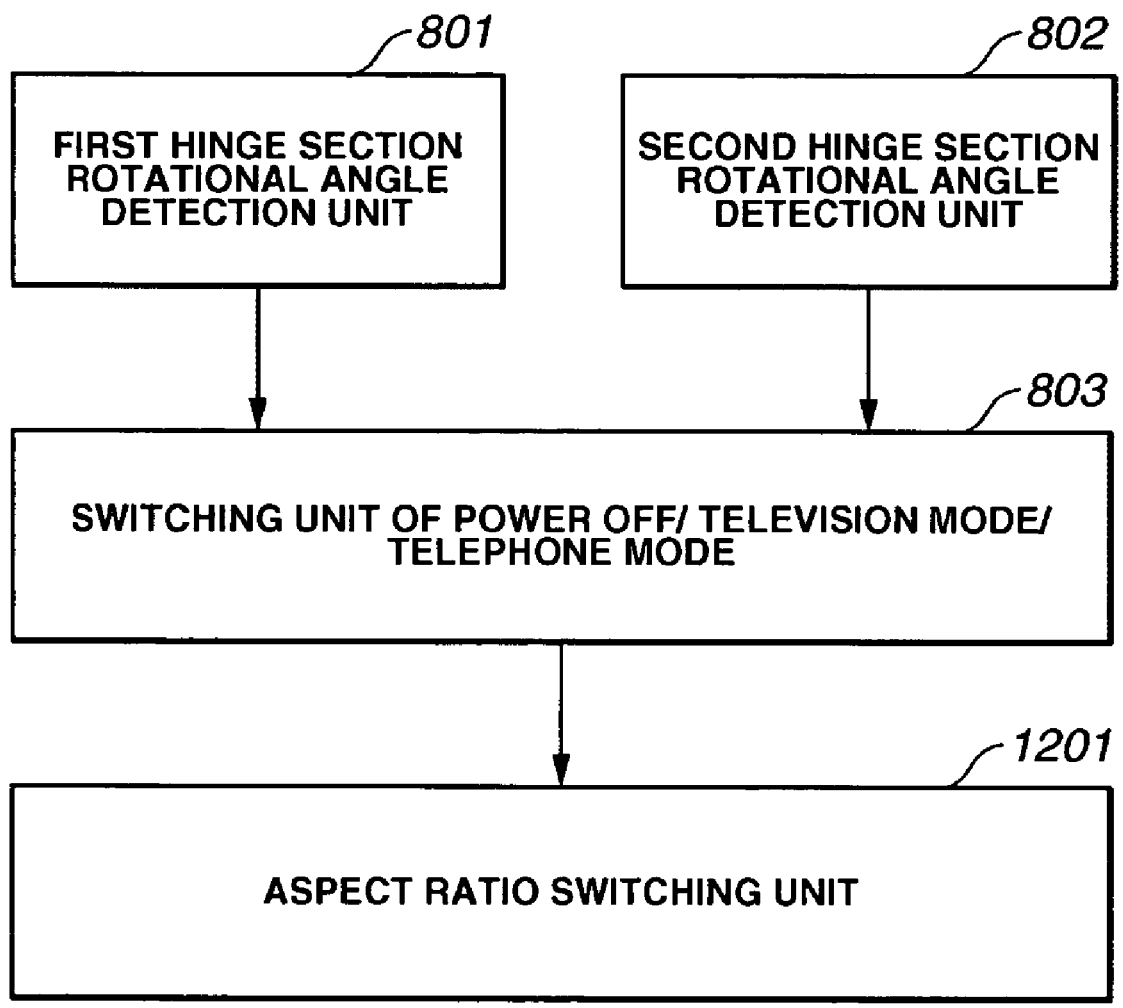
FIG. 12 is a block diagram of the television telephone terminal according to the third embodiment.

FIG. 12 is a block diagram of the television telephone terminal according to the third embodiment. Blocks 801 to 803 of FIG. 12 are similar in configuration to blocks 801 to 803 of the first embodiment, and, thus, a description thereof will not be repeated here. Reference numeral 1201 denotes an aspect ratio switching unit adapted to select an aspect ratio according to a mode selected by the mode switching unit 803 for the power off mode, the television mode, and the telephone mode.

Figure 13:
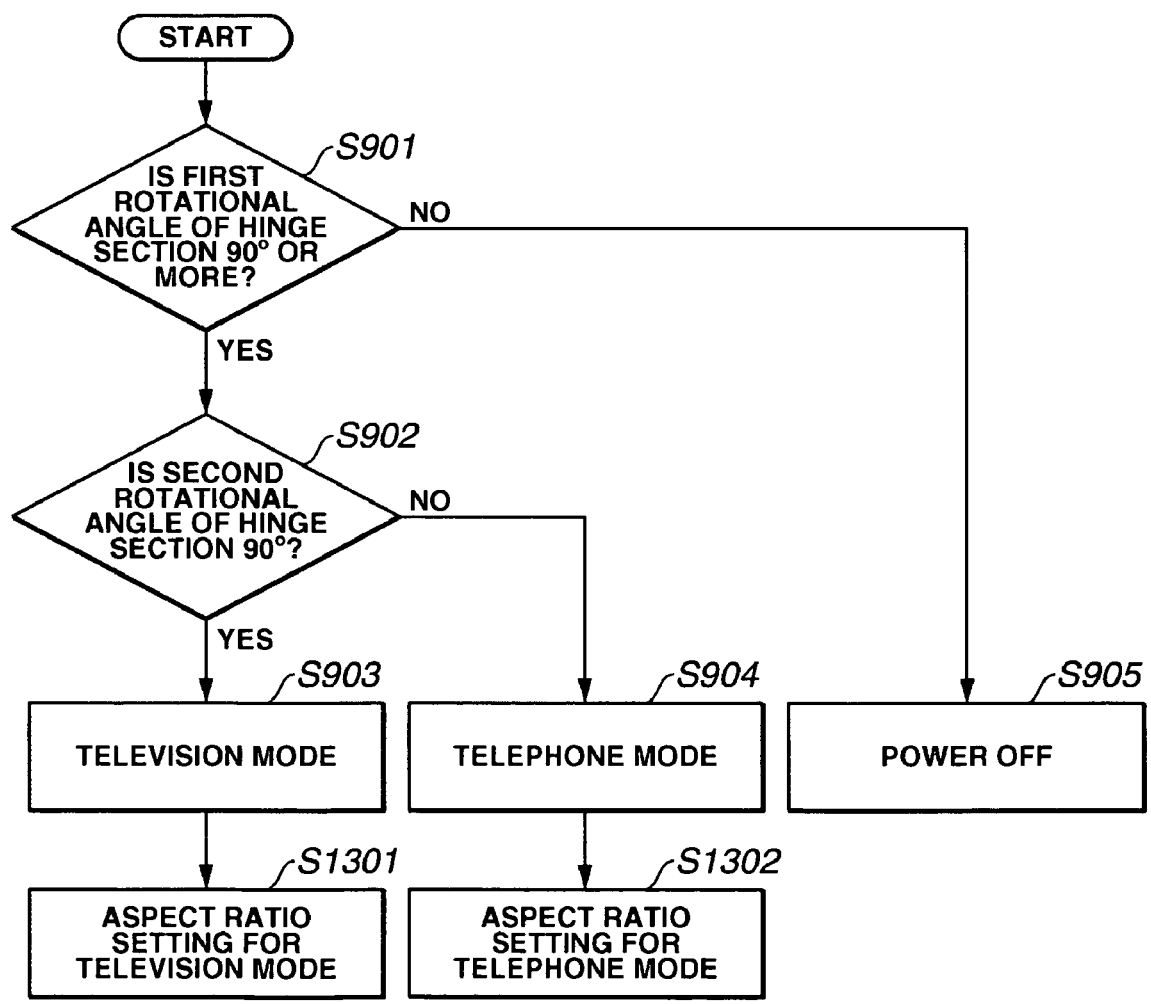
FIG. 13 is a flowchart showing an operation of the television telephone terminal according to the third embodiment.

Aspect ratio switching will now be specifically described next with reference to a flowchart of FIG. 13. Steps S901 to S905 of FIG. 13 are similar to steps S901 to S905 of FIG. 9, and, thus, a description thereof will not be repeated here. In step S1301, an aspect ratio for the television mode is selected. In step S1302, an aspect ratio for the telephone mode is selected. For example, in the case of the television mode, as the aspect ratio, i.e., the width to height ratio, of a television receiving screen is usually 4:3 or 16:9, the aspect ratio of the display unit 103 can be switched according to received television pictures. In the case of the telephone mode, the aspect ratio, i.e., the width to height ratio, of the display unit 103 may be 1:1, or may be, for example, 1:3 when a plurality of telephone directories are displayed. Thus, vertically long displaying may be conveniently executed to display as much information as possible.

In summary, switching the aspect ratio of the display unit 103 according to the telephone mode or the television mode facilitates the user acquiring as much information as possible.

Other Exemplary Embodiments

The various exemplary embodiments have been described by taking an example of the television telephone terminal as an image display apparatus capable of displaying images received from a plurality of input sources different in display format. That is, the television telephone terminal includes a television mode for displaying pictures obtained from television broadcast, and a telephone mode for displaying pictures obtained from television telephone communication. However, the present invention is not limited to such a terminal.

For example, a portable telephone apparatus that includes a television telephone mode and a camera photography mode may be used. In this case, for example, the invention can be implemented by disposing a digital camera on a backside of a display unit and directly substituting a block and a flow of the television function of each of the embodiments with the digital camera.

Moreover, it is understood that the units 801 to 803, 1001, and 1201 in the above-described embodiments are configured as hardware, but may be configured as software in part.

The present invention can be achieved by supplying a storage medium storing software program code to implement the functions of the above-described embodiments to a system or an apparatus. In this case, a computer (or a central processing unit (CPU), a micro processing unit (MPU)) of the system or the apparatus reads and executes the program code stored in the storage medium. Here, the program code itself read from the storage medium realizes novel functions, and the storage medium storing the program code and the program constitute the present invention.

The storage medium for supplying the program code includes, but is not limited to, for example, a flexible disk, a hard disk, an optical disk, a magneto-optical disk, a compact disc-read-only memory (CD-ROM), a compact disc-recordable (CD-R), a compact disc-rewritable (CD-RW), a digital versatile disc-random access memory (DVD-RAM), a digital versatile disc-rewritable (DVD-RW), a digital versatile disc-recordable (DVD-R), a magnetic tape, a nonvolatile memory card, a read-only memory (ROM), flash memory or the like.

The present invention is not limited to the realization of the functions of the above-described embodiments by executing the computer-read program code. The invention includes a case in which an operating system (OS) running on the computer executes a part or all of actual processing based on an instruction of the program code, and the functions of the embodiments are realized by this processing.

Furthermore, the present invention includes a case in which the functions are realized by writing the program code read from the storage medium in a memory disposed in a function expansion board inserted into the computer or a function expansion unit connected to the computer. In this case, after the writing, based on an instruction of the program code, a central processing unit (CPU) or the like disposed in the function expansion board or the function expansion unit executes a part or all of actual processing. Then, the functions of the embodiments are realized by this processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2004-331937 filed Nov. 16, 2004, which is hereby incorporated by reference herein in its entirety.

What is claimed is:

1. An image display apparatus, comprising:
    a first casing having an operation unit;
    a second casing having a display unit capable of displaying a plurality of images received from different input sources;
    a connection unit configured to interconnect the first and second casings and further adapted to allow the second casing to rotate relative to the first casing; and
    a display control unit configured to, responsive to a rotated state of the second casing relative to the first casing, switch images to be displayed on the display unit,
    wherein, responsive to a rotated state of the second casing relative to the first casing, the image display apparatus switches between a television mode for displaying a picture obtained through reception of television broadcast and a telephone mode for television telephone communication.

2. The image display apparatus according to claim 1, wherein the operation unit includes at least one function key, and wherein the at least one function key is configured for television settings when the image display apparatus is in the television mode, and is configured for telephone settings when the image display apparatus is in the telephone mode.

3. The image display apparatus according to claim 1, wherein the display control unit is configured to set an aspect ratio of the image displayed by the display unit to an aspect ratio suited for the telephone mode when the image display apparatus is in the telephone mode, and to an aspect ratio suited for the television mode when the image display apparatus is in the television mode.

4. The image display apparatus according to claim 1, the connection unit having a first and second axis of articulation, wherein the display unit displays an image for the telephone mode when the second casing is rotated about the first axis, and wherein the display unit displays an image for the television mode when the second casing is rotated about the second axis.

5. The image display apparatus according to claim 4, wherein the display unit has a longer height than width when configured in the telephone mode, and wherein the display unit has a longer width than height when configured in the television mode.

6. A display control method for an image display apparatus including a first casing having an operation unit, a second casing having a display unit capable of displaying a plurality of images received from different input sources, and a connection unit configured to interconnect the first and second casings and to allow the second casing to rotate relative to the first casing, the display control method comprising:
    detecting a rotated state of the second casing relative to the first casing; and
    switching images to be displayed on the display unit responsive to the rotated state of the second casing relative to the first casing,
    wherein, responsive to a rotated state of the second casing relative to the first casing, switching occurs between a television mode for displaying a picture obtained through reception of television broadcast and a telephone mode for television telephone communication.

7. A computer readable medium containing computer-executable instructions to perform a display control method for an image display apparatus including a first casing having an operation unit, a second casing having a display unit capable of displaying a plurality of images received from different input sources, and a connection unit configured to interconnect the first and second casings and to allow the second casing to rotate relative to the first casing, the computer readable medium comprising:
- computer-executable instructions for detecting a rotated state of the second casing relative to the first casing; and
- computer-executable instructions for, responsive to the rotated state of the second casing relative to the first casing detected in the detection code, switching images to be displayed on the display unit,
- wherein, responsive to a rotated state of the second casing relative to the first casing, switching occurs between a television mode for displaying a picture obtained through reception of television broadcast and a telephone mode for television telephone communication.

8. An image display apparatus, comprising:
- a first casing having an operation unit;
- a second casing having a display unit capable of displaying a plurality of images received from different input sources;
  - a connection unit configured to interconnect the first and second casings and further adapted to allow the second casing to rotate relative to the first casing; and
- a control unit configured to, responsive to a rotated state of the second casing relative to the first casing, switch a telephone mode to a television mode for displaying a picture obtained through reception of television broadcast on the image display unit.

9. The image display apparatus according to claim 8, wherein the operation unit includes at least one function key, and wherein the at least function key is configured for television settings when the image display apparatus is in the television mode, and is configured for telephone settings when the image display apparatus is in the telephone mode.

10. The image display apparatus according to claim 8, wherein the display control unit is configured to set and aspect ratio of the image displayed by the display unit to an aspect ratio suited for the telephone mode when the image display apparatus is in the telephone mode, and to an aspect ration suited for the television mode when the image display apparatus is in the television mode.

11. The image display apparatus according to claim 8, the connection unit having a first and second axis of articulation, wherein the display unit displays and image for the telephone mode when the second casing is rotated about the first axis, and wherein the display unit displays an image for the television mode when the second casing is rotated about the second axis.

12. The image display apparatus according to claim 11, wherein the display unit has a longer height than width when configured in the telephone mode, and wherein the display unit has a longer width than height when configured in the television mode.

13. A display control method for an image display apparatus including a first casing having an operation unit, a second casing having a display unit capable of displaying a plurality of images received from different input sources, and a connection unit configured to interconnect the first and second casings and to allow the second casing to rotate relative to the first casing, the display control method comprising:
- detecting a rotated state of the second casing relative to the first casing; and
- switching a telephone mode to a television mode for displaying a picture obtained through reception of television broadcast on the image display unit, responsive to the rotated state of the second casing relative to the first casing.

14. A computer readable medium containing computer-executable instructions to perform a display control method for an image display apparatus including a first casing having an operation unit, a second casing having a display unit capable of displaying a plurality of images received from different input sources, and a connection unit configured to interconnect the first and second casings and to allow the second casing to rotate relative to the first casing, the computer readable medium comprising:
- computer-executable instructions for detecting a rotated state of the second casing relative to the first casing; and
- computer-executable instructions for switching a telephone mode to a television mode for displaying a picture obtained through reception of television broadcast on the image display unit, responsive to the rotated state of the second casing relative to the first casing.

* * * * *